Oct. 11, 1938.  J. F. PIERCE  2,132,802
INTERNAL COMBUSTION ENGINE
Filed July 21, 1937  2 Sheets-Sheet 1
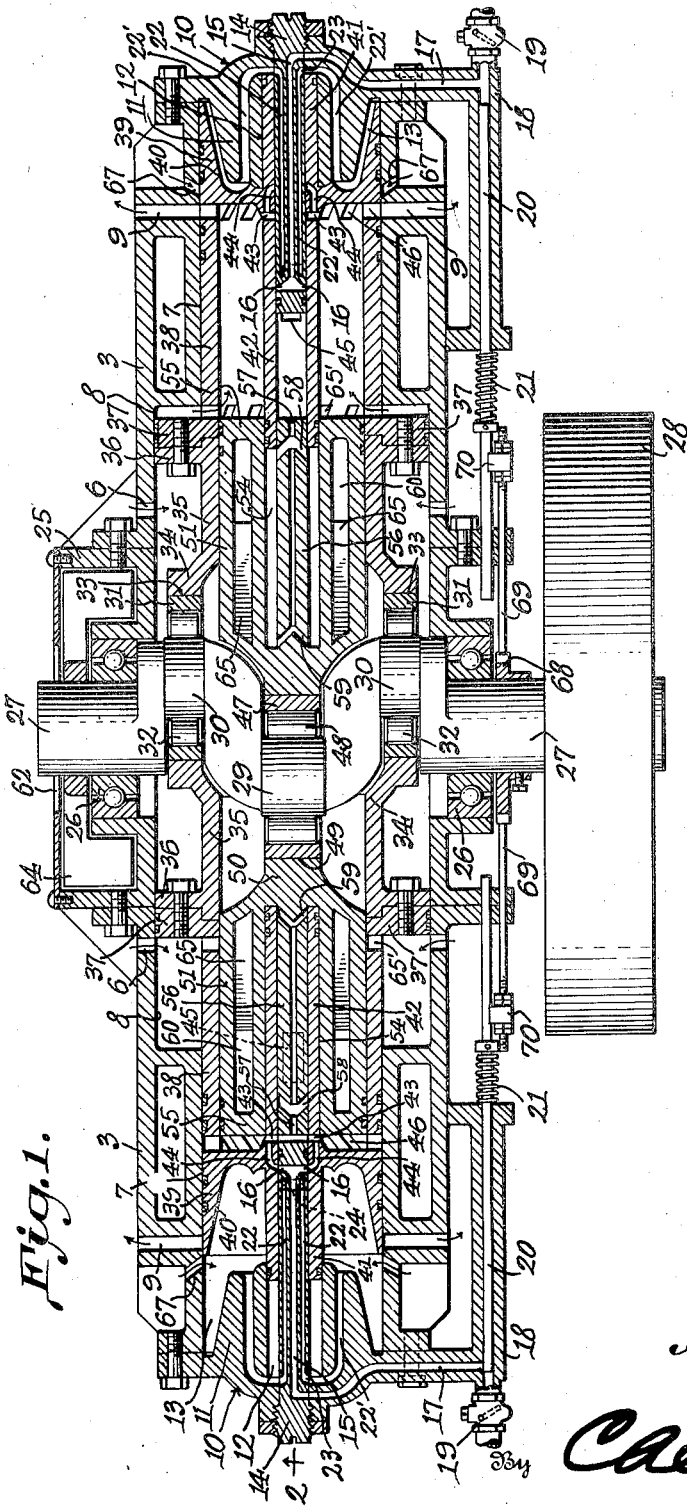
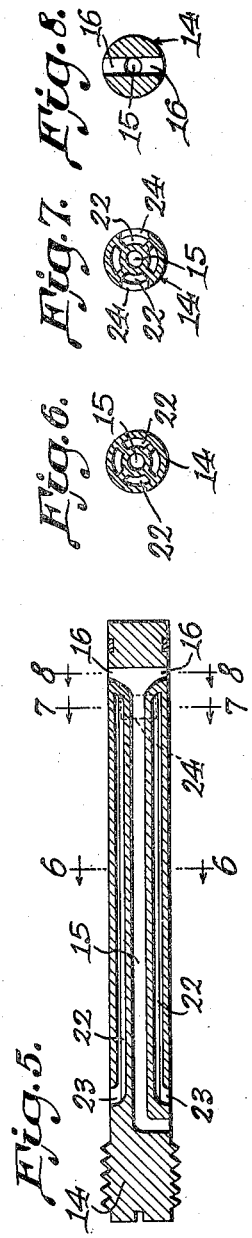
Inventor
J. F. Pierce
By CASnow&Co.
Attorneys

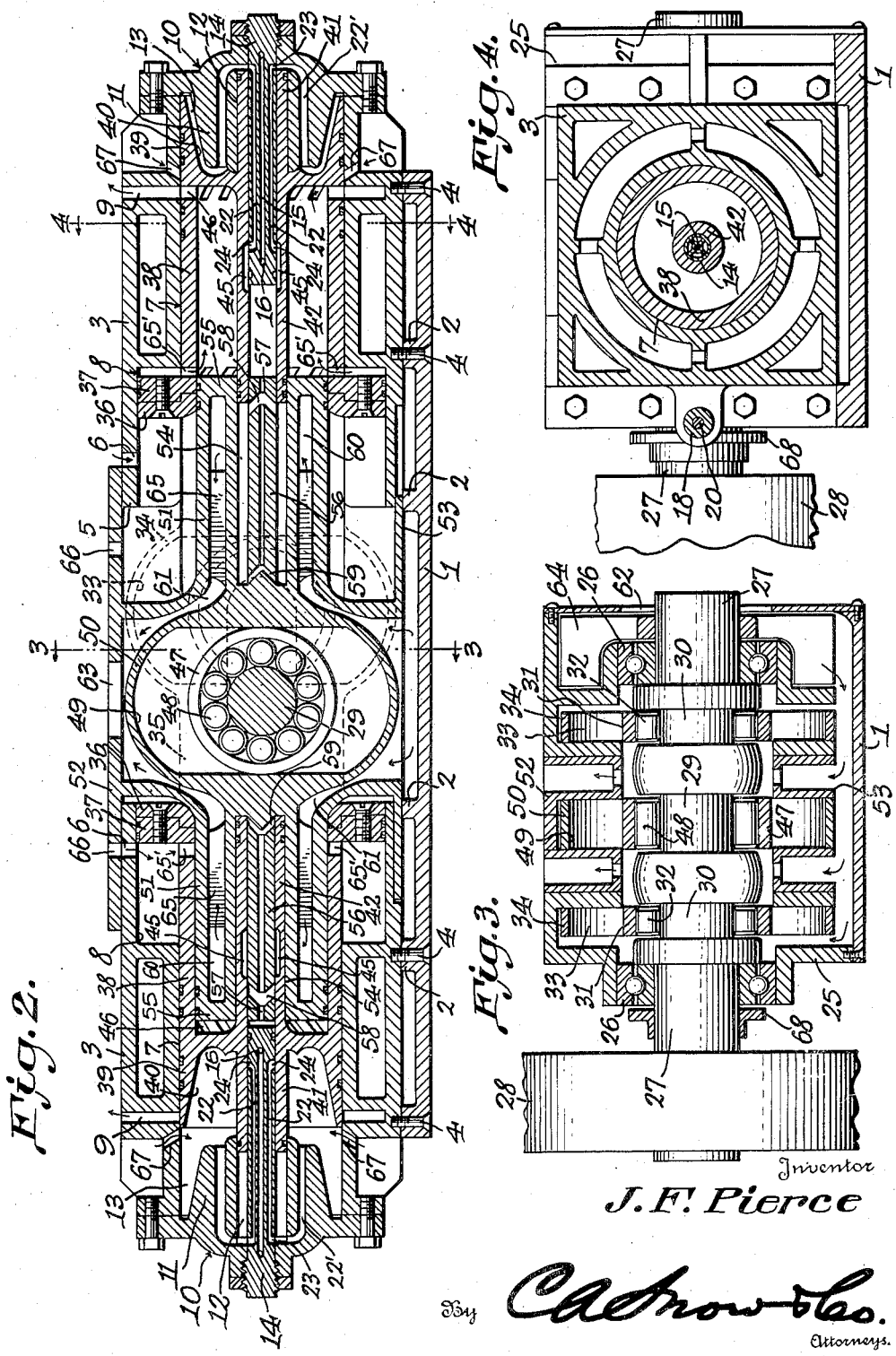

Patented Oct. 11, 1938

2,132,802

UNITED STATES PATENT OFFICE 2,132,802

INTERNAL COMBUSTION ENGINE

Jefferson F. Pierce, Tampa, Fla.

Application July 21, 1937, Serial No. 154,869

3 Claims. (Cl. 123—33)

This invention relates to internal combustion engines and while it is designed more particularly for use as a Diesel engine, it is to be understood that with the necessary obvious additions, it can likewise be operated as an ordinary gasoline engine requiring ignition means.

It is an object of the invention to provide a novel arrangement of interfitting pistons and cylinders whereby air will be automatically placed under compression for use in expelling burned gases following explosions and other air will also be placed under compression for injection into fuel at the point of combustion.

A still further object is to provide efficient means for directing suitably measured fuel into the combustion chamber where it is mixed with air under pressure.

A still further object is to provide simple means to operate efficiently to maintain the working parts cool while in operation.

Another object is to provide an internal combustion engine which is of simple design and can be produced at low cost, said engine being adapted to various uses and conditions and being capable of producing maximum power with the use of the minimum amount of fuel.

A still further object is to provide an engine in which the main shaft bearings are relieved of all pressure and consequent friction resulting from both the compression and power stroke.

Another object is to provide an engine which eliminates the use of pitman or connecting rods.

A further object is to provide an engine in which the combined piston travel is double that of the cranks driving the respective pistons, thereby setting up a complete balance as well as a double leverage in completing compression at the end of the stroke and also relieving the main bearings from this load or any portion of the load produced by the power stroke.

Another object is to provide an engine wherein the pistons are cooled by air from outside without coming in contact with any wearing part where lubrication is necessary, thereby eliminating the use of air cooled by a radiator.

Another and very important object is to so deliver the air and fuel under compression into the exposed chamber as to set up a mist or spray, thereby producing a mixture which can be readily exploded under the required compression.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings—

Figure 1 is a horizontal section through an engine embodying the present improvement.

Figure 2 is a section on line 2—2, Figure 1.

Figure 3 is a section on line 3—3, Figure 2.

Figure 4 is a section on line 4—4, Figure 2.

Figure 5 is a central longitudinal section through one of the plungers.

Figure 6 is a section on line 6—6, Figure 5.

Figure 7 is a section on line 7—7, Figure 5.

Figure 8 is a section on line 8—8, Figure 5.

Referring to the figures by characters of reference 1 designates the bed of the engine formed preferably with spacing ribs 2 on which is mounted the water-cooled engine block 3 secured thereto in any suitable manner, as by means of bolts 4. The top of the engine block is provided at its center with an opening 5 adjacent to which are located ports 6 for the admission of scavenging air.

Each end of the block 3 has a cylinder 7 the inner end of which is counterbored to provide a larger or inner cylinder 8. A desired number of exhaust ports 9 extend through the wall of cylinder 7 near the outer end thereof.

The engine disclosed in the present application is made up of oppositely disposed duplicate portions and, therefore, the following description which relates solely to one end portion of the engine will obviously apply equally as well to the opposite end portion.

The outer end of cylinder 7 is closed by a detachable head 10 provided, on its inner surface, with a tapered extension concentric with the axis of the cylinder and having a concentric cylindrical recess 12. This extension 11 cooperates with the wall of cylinder 7 to provide a deep annular channel 13.

Seated within the center of head 10 is one end of a fuel and air injection stem 14 coaxial with the cylinder and extending thereinto. This stem has a central fuel passage 15 provided with diametrically opposed outlet ports 16 near the inner end of the stem. The outer end of this passage is in communication with the fuel outlet passage 17 of a fuel pump 18 which, in the construction shown, is located at one side of the engine block 3 and has a valved intake 19 and a reciprocating plunger 20. This plunger can be provided with a spring 21 for holding it normally retracted away from the outlet passage 17.

The stem 14 is formed with opposed longitudinal air passages 22 provided, at their outer ends, with intake ports 23 in constant communication with passages 22' leading to the channel 13 as shown in Figures 1 and 2. The inner ends of these passages 22 have diametrically opposed outlet ports 24 set back from the ports 16 and disposed in a plane extending longitudinally of the stem but at right angles to the longitudinal plane occupied by the ports 16.

The two blocks 3 are joined, at their inner or counterbored ends, to an interposed bearing block 25 provided with opposed bearings 26 in which is journalled a transverse shaft 27 which can carry a fly-wheel 28. The shaft 27 is provided at its center with a crank 29 and extending in a direction opposite thereto are parallel cranks 30 located at opposite sides respectively of crank 29.

Mounted on crank 30 are rings 31 preferably provided with anti-friction bearings 32 and mounted to work within slots 33 formed with a cross-head 34. These slots, in a horizontal engine, are extended vertically while the cross-head is mounted for horizontal movement between the opposed cylinders.

The cross-head has opposed cylindrical extensions 35 each of which has an annular flange 36 to which is joined the annular head 37 of the outer or tubular piston 38. The head 37 is located at the inner end of this piston while at the outer end thereof there is provided a head 39 having a tapered recess 40 adapted to receive the tapered extension 11 on head 10. The head 39 is also provided with a central tubular stem 41 extending outwardly therefrom and mounted for reciprocation within the cylindrical recess 12 and upon the stationary stem 14. A tubular stem 42 is also extended inwardly from the head 39 in line with stem 41 and is likewise mounted for reciprocation on the stem 14. This tubular stem 42 is provided, close to head 39, with opposed ports 43 adapted to move into register with the ports 16 and by-passes 44 are formed in head 39 and extend outwardly from ports 43 and open inwardly toward the stem 14 where they can register with ports 24 while ports 16 are registering with the ports 43.

At an intermediate point in tubular stem 42 there are provided diametrically opposed by-passes 45 so located that when the piston 38 is in one extreme position, as shown at the right of Figures 1 and 2, the ports 16 will be closed while the ports 24 will be in communication with that portion of the interior of tubular stem 42 in front of stem 14.

An annular series of exhaust ports 46 is provided in the wall of piston 38 close to head 39 and are so located as to register with the exhaust port 9 when the cylinder is in one extreme position as shown at the right of Figures 1 and 2.

The middle crank 29 carries a ring 47 which can be mounted on anti-friction bearings 48 and this ring operates in a slot 49 formed in a cross-head 50. The cross-head is interposed between opposed inner pistons 51 each of which is mounted for reciprocation within the adjacent outer piston 38. These inner pistons and their cross-heads are joined to or made integral with upper and lower slides 52 and 53 mounted to reciprocate upon the opposed surfaces of the blocks 3.

Piston 51 has a central bore 54 extending thereinto to form its head 55 and proportioned to receive the tubular stem 42. Within and spaced from the wall of the bore 54 is a plunger 56 adapted to reciprocate within stem 42 and provided with a central longitudinal passage 57 open at the free end of the plunger, as shown, and provided near each end with ports 58 and 59 respectively opening into the bore 54.

The wall of piston 51 is hollow to provide an annular cooling chamber 60 which, as shown particularly in Figure 2, opens through clearances 61 into the space within bearing block 25, air being free to flow within this space from a side opening 62 to an outlet opening 63, the air being circulated or propelled by a fan 64 secured to shaft 27 and rotatable therewith within the bearing block and close to the opening 62. The cooling chamber 60 can be provided with partitions 65 so that the circulating air will be caused to travel longitudinally within the chamber as indicated by the arrows in Figure 2.

It will be noted that the outer piston 38 is provided with an annular series of intake ports 65' in the wall thereof close to head 37, these ports being adapted to open into the counterbore 8.

It will be noted that ports 66 are also formed in the slide 52 and are so located that when the inner cylinder 51 reaches either limit of its movement, both of the ports 6 will be opened by the slide.

There is provided in the block 3, adjacent to the ports 9, a series of air intake ports 67 so located as to be closed by piston 38 when the ports 9 are open and to be opened by said piston when the ports 9 are closed. The first of these positions has been shown at the right of Figure 1 while the second position has been shown at the left thereof.

Each pump 20 can be operated by any suitable means, and is utilized for supplying suitably measured charges of fuel at the proper times during the operation of the engine. The pump operating means can comprise a cam 68 rotatable with the shaft 27 and adapted to operate a suitably guided rod 69 joined in any manner desired to the plunger 20, as indicated at 70.

*Operation*

Let it be assumed that combustion has occurred and piston 38 has forced the piston heads 55 and 39 to the positions shown at the right of Figure 1. Air which has been trapped between head 37 and the end of the counterbore 8 will rush through the opened ports 65 as soon as they are uncovered by the inner piston 51 and as ports 46 are at the same time brought into register with the ports 9, this inrushing air will act to scavenge the combustion chamber and drive out the burned gases through the exhaust ports 9. During this combustion stroke of the two pistons 38 and 51, air which had been admitted between the heads 11 and 39 through the open ports 67, will be compressed between said heads within the annular recess 40 and within the passages 22' and 22 where it will be delivered through ports 24 to by-passes 45 into tubular stem 42 and thence into the passage 57 and bore 54 so as to fill the said bore. At this time combustion takes place between the piston heads 55 and 39 at the other end of the engine which piston heads are located as shown at the left of Figure 2. Consequently pistons 55 and 39 at the right of Figure 2 will be moved toward each other. As piston 51 advances toward head 39 it will close ports 65' through which the scavenging air has been supplied and head 39 will close the exhaust ports 46 and 9. As the two piston heads 55 and 39 continue to travel toward each other, the air trapped within the bore 54 because of the relative movement of the piston 51 and cam 42, will be placed under high compression within stem 42, the by-passes 45 having in the meantime passed out of communication with the ports 24. As the two piston heads reach the firing point, as shown for example at the left of Figures 1 and 2, the ports 43 are brought into register with that portion of the interior of stem 42 between stem 14 and plunger 56. At the same time the by-passes 44 will come into register with the ports 16. The pump is so timed that its plunger 20 will force a measured charge of fuel through outlet passage 17 into fuel passage 15 and expel it through the by-passes 44 into the ports 43 while at the same time the highly compressed air contained between stem 14 and plunger 56 will rush through ports 43 and past the outlet ends of the by-passes 44 into the space between the two piston heads. Because of the high compression of the air and fuel and the minute atomizing and thorough mixing which takes place because of the movement of the air across the path of the fuel, this fuel will be instantly ignited, thereby forcing the piston heads 55 and 39 apart from the positions shown at the left of Figures 1 and 2 and to the positions shown at the right of said figures at which time the exposed chamber will be scavenged as before explained.

It will be noted that during the operation of the engine as explained combustion will occur successively in opposed sides of the engine and as the crank shaft is actuated as a result thereof, the fan will also be operated to set up the forced circulation of cooling air taken from outside the engine.

Obviously the pump used for directing fuel into the engine must have a variable stroke controlled by the speed of the engine in a manner well known in the art and, therefore, it has not been deemed necessary to show or describe the construction in detail.

What is claimed is:

1. An internal combustion engine including a cylinder block, interfitting inner and outer hollow pistons therein, a shaft, means operated by the pistons, when moved simultaneously in opposite directions respectively, for rotating the shaft in one direction, a stationary injection tube, a fuel passage opening therethrough, an air passage opening therethrough, means actuated by the shaft for forcing fuel into the fuel passage, a head on the cylinder block cooperating with the outer piston to compress air into the air passage, a tubular stem carried by the outer piston and slidable on the injection tube, said inner piston being slidable on said tubular stem and having a bore to receive the said stem, a plunger carried by the inner piston and located within said bore, said plunger being slidable in and opening into the tubular stem, a by-pass for directing compressed air from the air passage into the tubular stem and the plunger and bore when the heads of the pistons are moved apart, said plunger and stems cooperating to close the by-pass and compress the air in the stems when the piston heads are moved toward each other, ports for releasing the fuel in radial jets between the piston heads when the air is brought to maximum compression, and ports for releasing said compressed air across the jets of released fuel and into the space between the piston heads to produce a combustible mixture.

2. An internal combustion engine including a cylinder block having a counterbore provided with an inlet for scavenging air, and having a bore with an exhaust port and an air inlet, an outer hollow piston mounted for reciprocation in the block, a cylinder head, a head at one end of the piston cooperating with the cylinder head to trap and compress air admitted through the inlet, an exhaust port in the piston positioned for registering with the exhaust port in the cylinder while said air is under compression, an air inlet in the piston opening into the counterbore, a head at the inner end of the outer piston and in the counterbore for compressing scavenging air, an inner piston mounted for reciprocation in the outer piston and movable in one direction to open the air inlet port in the outer piston to admit compressed scavenging air, a bore in the inner piston, a plunger therein having a passage extending from the free end thereof to the bore, a stationary injection stem carried by the head of the cylinder, a fuel passage therein having an outlet, an air passage therein positioned to receive air compressed by the outer piston, a tubular stem carried by the outer piston and slidable on the injection stem and the plunger, a by-pass for delivering compressed air from said passage into the tubular stem, plunger and bore, a shaft, means operated by the pistons when moved in opposite directions respectively for rotating the shaft in one direction, means operated by the shaft for forcing a charge of fuel into the fuel passage, said plunger and stems cooperating to close the by-pass and compress the air in the stems when the piston heads are moved toward each other, ports for releasing the fuel in radial jets between the piston heads when the air is brought to maximum compression, and ports for releasing said compressed air across the jets of released fuel and into the space between the piston heads to produce an explosive mixture.

3. An internal combustion engine including a cylinder, a cylinder head, a fuel and air injection stem carried by the head, an outer piston, a tubular stem carried thereby and slidably mounted on the injection stem, said tubular stem having outlet ports, an inner piston having a bore in which the tubular stem is mounted to work, an apertured plunger in the bore, a shaft, means operated by the pistons when moved in opposite directions respectively for rotating the shaft, cooperating interfitting means on the cylinder head and piston for effecting initial air compression, cooperating means carried by the stems for directing the initially compressed air into the tubular stem and bore, and means for forcing fuel into the injection stem for delivery into the outlet ports in the tubular stem when opened, said tubular stem cooperating with the bore, plunger and injection stem to subject the air in the tubular stem to added compression and said tubular and injection stems cooperating to open the ports in the tubular stem upon the completion of said added compression to release the air in jets into the space between the pistons and to release the fuel into the jets.

JEFFERSON F. PIERCE.